Oct. 14, 1947.   R. A. MONTAMAT   2,428,851
EXTRUSION APPARATUS
Filed April 18, 1944

INVENTOR
Raymond A. Montamat
BY
George J. Schotteler
ATTORNEY

Patented Oct. 14, 1947

2,428,851

UNITED STATES PATENT OFFICE 2,428,851

EXTRUSION APPARATUS

Raymond A. Montamat, Scotch Plains, N. J., assignor to General Cable Corporation, New York, N. Y., a corporation of New Jersey Application April 18, 1944, Serial No. 531,536

2 Claims. (Cl. 18—13)

1

This invention relates to apparatus for extruding vulcanizable compositions and pertains more particularly to extrusion apparatus for applying a sheathing of insulating material to electrical conductors in the form of wire or cable.

In applying a sheathing of insulating material to electrical conductors, it is now common manufacturing practice to use continuous vulcanization processes in which a sheathing of unvulcanized insulating compound is first applied by extrusion to a moving conductor, with the sheathed conductor then moving on to a vulcanization chamber where vulcanization proceeds continuously as the sheathed conductor moves through the chamber. Such processes are extremely fast and efficient, but require the use of reliable extrusion apparatus for the production of satisfactory product.

In an effort to secure increased production and increased efficiency, operating speeds have been increased, and more rapid accelerators have been used in the insulating compound to enable vulcanization to be completed within practicable limits of time and space. In using such compounds it has been observed that small portions of the insulating compound sometimes become vulcanized in the extrusion head to an extent sufficient to cause such portions to lose their plasticity.

When such vulcanized portions reach the forming die they sometimes stick in the die passages, thus preventing proper feed of compound to the wire and resulting in defective sheathing. Even if such vulcanized portions pass through the die, the sheathing may be defective. Such difficulties have been extremely troublesome, particularly when multiple extrusion has been attempted, i. e., running two or more conductors through a single extrusion head at the same time. Even with a single conductor the waste of time and materials resulting from a clogged die is serious when running at high speed. With multiple extrusion the waste is much more serious.

It is an object of the invention to overcome these difficulties.

Other objects and advantages of the invention will appear hereinafter.

A preferred embodiment of the invention selected for purposes of illustration is shown in the accompanying drawings, in which, Figure 1 is a cross section through a typical extrusion head having a die block adapted for multiple extrusion, the scale being approximately one-half of full size.

Figure 1:
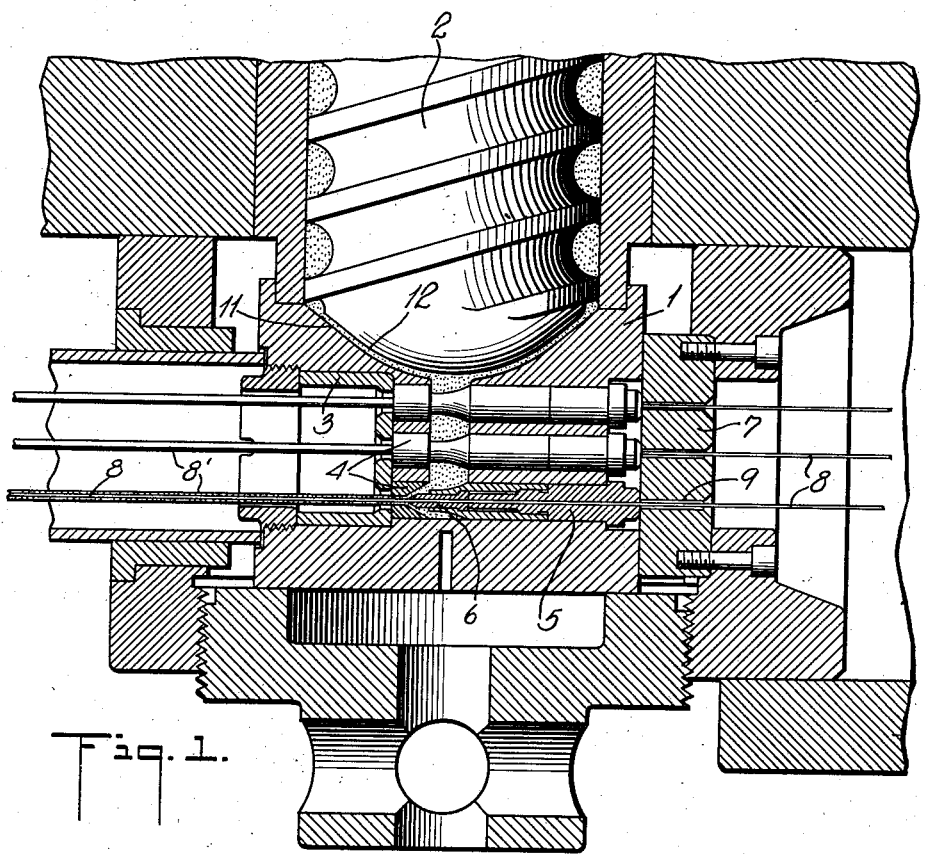
Figures 2, 3:
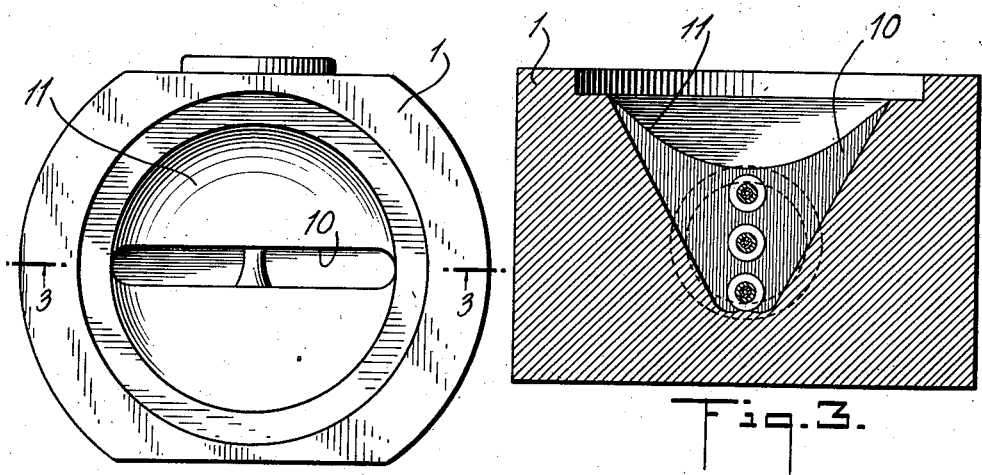
Figure 2 is a plan view of the die block with the stock screw removed.
Figure 3 is a section on the line 3—3 of Figure 2.

Referring to the drawings, the pertinent parts of a typical extrusion head are illustrated including a die block 1, a stock screw 2, a die backing insert 3 which backs a plurality of dies 4, a plurality of tip holder assemblies 5 each holding a guide tip 6, and a guide bushing 7. In operation, as well understood, conductors 8 are fed through guide passages 9 of the guide bushing 7, thence through the tip holders 5 and tips 6 to the dies 4. As the conductors pass through the dies 4, the compound which is fed into the die block passage 10 by the stock screw is extruded through the dies to apply a sheathing 8' to each conductor.

The invention herein resides in shaping the die block face 11 and the end face 12 of the stock screw in such manner that their opposed surfaces conform to one another, thus insuring uniform movement of the compound toward the die. Thus, as shown, the die block face 11 and the end face 12 of the stock screw are similarly shaped, with the result that the opposed surfaces are equally spaced at all points. This provides uniform clearance at all points, and I have found that such clearance should be not less than .0312" nor more than .0937".

In the preferred embodiment illustrated the stock screw protrudes into a recess in the die block and the opposed surfaces of the screw and cavity are of sphero-conical form, the central portions being spherical surfaces preferably having radii slightly greater than the radius of the stock screw, and the peripheral portions being conical surfaces preferably inclined at an angle of approximately 40° to the horizontal. The spherical surfaces merge smoothly into the conical surfaces, as shown. However, the shape of the die block face and the end face of the stock screw may vary considerably so long as they conform to one another and are adjusted to the proper clearance.

When such conditions are observed, I have found it possible to use multiple dies and to extrude at high speeds, i. e., in excess of 600' per minute without difficulty.

It will be understood that the invention may be variously modified and embodied within the scope of the subjoined claims.

I claim as my invention:

1. Apparatus for extruding vulcanizable insulating compound on a continuously moving electrical conductor comprising a stock screw for feeding the compound, the stock screw having a rounded end, a die block having a recess into which the rounded end of the stock screw protrudes, the opposed surfaces of said recess and stock screw being shaped to conform to one another and being spaced to provide uniform clearance therebetween of not less than .0312" nor more than .0937", a die mounted in the die block through which the conductor moves for applying compound to the conductor, and a passage in the die block to guide the compound from the end of the stock screw to the die.

2. Apparatus for extruding vulcanizable insulating compound on a continuously moving electrical conductor comprising a stock screw for feeding the compound, a die block having a recess into which the end of the stock screw protrudes, the opposed surfaces of said recess and stock screw being shaped to conform to one another and being spaced to provide uniform clearance therebetween of not less than .0312" nor more than .0937", the central portions of said surfaces being spherical and the peripheral portions of said surfaces being conical, a die mounted in the die block through which the conductor moves for applying compound to the conductor, and a passage in the die block to guide the compound from the end of the stock screw to the die.

RAYMOND A. MONTAMAT.

REFERENCES CITED

The following references are of record in the file of this patent:

UNITED STATES PATENTS

| Number | Name | Date |
|---|---|---|
| 1,608,980 | Gordon | Nov. 30, 1926 |
| 2,096,362 | Lehman | Oct. 19, 1937 |
| 1,100,002 | Van Ness | June 16, 1914 |
| 2,035,247 | Royle | Mar. 24, 1936 |
| 2,177,633 | Blackard | Oct. 31, 1939 |
| 1,092,451 | Pierce | Apr. 7, 1914 |
| 2,294,555 | Hendrie | Sept. 1, 1942 |
| 2,340,834 | Hanson | Feb. 1, 1944 |

OTHER REFERENCES

Saran for Injection Molding, Modern Plastics, Oct. 1942, pages 67–71, 118 and 120.